United States Patent [19]
Suga et al.

[11] Patent Number: 5,190,014
[45] Date of Patent: Mar. 2, 1993

[54] VAPORIZED FUEL CONTROL SYSTEM FOR VEHICULAR INTERNAL COMBUSTION ENGINE

[75] Inventors: Toshiyuki Suga; Shinichi Kitajima, both of Wako; Yoshihiko Kobayashi, Haga, all of Japan

[73] Assignee: Honda Giken Kogyo Kabushiki Kaisha, Tokyo, Japan

[21] Appl. No.: 801,285

[22] Filed: Dec. 2, 1991

[30] Foreign Application Priority Data

Nov. 30, 1990 [JP] Japan .................................. 2-336802

[51] Int. Cl.$^5$ ............................................ F02M 33/02
[52] U.S. Cl. ..................................... 123/519; 123/494; 123/516; 123/1 A
[58] Field of Search ............... 123/1 A, 516, 519, 520, 123/521, 494

[56] References Cited

U.S. PATENT DOCUMENTS

| | | | |
|---|---|---|---|
| 4,446,838 | 5/1984 | Suzuki | 123/519 |
| 4,949,695 | 8/1990 | Uranishi | 123/520 |
| 4,962,744 | 10/1990 | Uranishi | 123/494 |
| 4,962,746 | 10/1990 | Miyata | 123/494 |
| 5,044,344 | 9/1991 | Tuckey | 123/497 |
| 5,067,468 | 11/1991 | Otowa | 123/516 |
| 5,088,466 | 2/1992 | Tada | 123/494 |

Primary Examiner—Carl S. Miller
Attorney, Agent, or Firm—Nikaido, Marmelstein, Murray & Oram

[57] ABSTRACT

A system according to the invention controls the vaporized amount of a blended fuel composed of gasoline and an alcohol such as methanol and contained in a fuel tank mounted at a vehicular internal combustion engine. The methanol concentration in the fuel is sensed and from the sensed value, reid vapor pressure of the fuel is presumed. The pressure in the fuel tank is then regulated at a target pressure by adjusting the amount of vaporized fuel to be removed from the fuel tank and fed to a canister in response to the presumed reid vapor pressure.

3 Claims, 3 Drawing Sheets

VAPORIZED FUEL CONTROL SYSTEM FOR VEHICULAR INTERNAL COMBUSTION ENGINE

BACKGROUND OF THE INVENTION

1. Field of the Invention

This invention relates to a vaporized fuel control system for a vehicular internal combustion engine enabling to use a blended fuel of gasoline and alcohol.

2. Description of the Prior Art

As a vaporized fuel control system for an engine able to use a blended fuel composed of gasoline and an alcohol such as methanol (methyl alcohol), Japanese Laid-open Patent Publication No. 1-106,971 teaches a system characterized in that the amount of the vaporized fuel supplied to the engine air intake system is controlled in proportion to the alcohol concentration of the fuel.

Apart from the above, recent years have seen an increasing number of proposals to reduce the size and weight of various components mounted on or connected to a vehicular internal combustion engine in order to improve fuel consumption efficiency. A fuel tank will be one of the components to be made smaller and lighter. However, when a fuel tank contains the blended fuel composed of gasoline and an alcohol such as methanol, the reid pressure of the vaporized fuel in the tank varies with respect to its methanol content as shown in a graph of FIG. 4. The reid vapor pressure, often called "RVP" in the field, has a close relationship with the pressure in the tank. In order to reduce the size and weight of the fuel tank, the pressure in the tank should be, therefore, regulated at a predetermined level.

The object of this invention is therefore to provide a system for controlling the amount of vaporized fuel in a fuel tank composed of a blend of gasoline and an alcohol such as methanol in which the pressure in the fuel tank is regulated properly so as to make it possible to reduce the size and weight of the fuel tank and thus improve fuel consumption efficiency.

SUMMARY OF THE INVENTION

This invention achieves the object by providing a system for controlling an amount of vapor fuel evaporating from a blended fuel composed of gasoline and an alcohol contained in a fuel tank mounted at a vehicular internal combustion engine, to be fed to a canister connected to the tank, comprising, first means for detecting alcohol concentration in the blended fuel, second means for detecting the pressure in the tank and control means for adjusting the amount of vapor fuel fed to the canister in such a manner that the in-tank pressure is kept at a predetermined pressure.

BRIEF DESCRIPTION OF THE DRAWINGS

This and other objects and advantages of the invention will be more apparent from the following description and drawings, in which.

DESCRIPTION OF THE PREFERRED EMBODIMENTS

An embodiment of the invention will now be explained with reference to the drawings.

Figure 1:
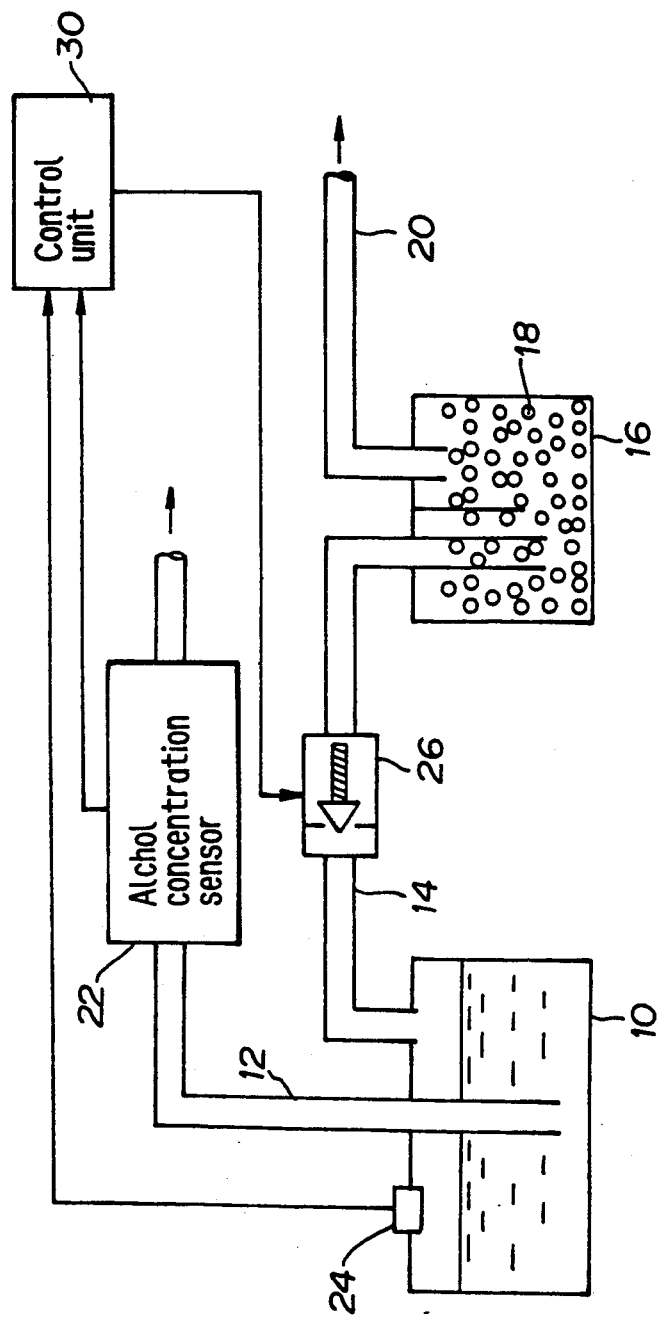
FIG. 1 is an overall view showing a vaporized fuel control system for a vehicular internal combustion engine according to the invention.

In FIG. 1, reference numeral 10 designates a fuel tank containing a blended fuel composed of gasoline and a methyl alcohol (methanol) and mounted at a vehicle having an internal combustion engine, neither shown, and reference numeral 12 designates a fuel supply conduit connecting the fuel tank 10 with an air intake system, not shown, of the engine for supplying the fuel thereto. The top of the fuel tank 10 is connected with, via a vapor passage 14, a canister 16 charged with an absorbent 18 such as activated carbon for absorbing vaporized fuel supplied to the canister 16 from the fuel tank 10. And a purge passage 20 is provided between the canister 16 and the engine air intake system for supplying the vaporized fuel to the system.

The fuel supply conduit 12 is equipped with an alcohol concentration sensor 22. The alcohol concentration sensor 22 is located at a position suitable to sense alcohol in the fuel delivered to the air intake system. The sensor 22 may comprise a capacitance probe inserted in the conduit 12, which has a capacitance variable independence on the alcohol concentration in the fuel to produce a signal proportional to the probe capacitance, for detecting the methanol content in the blended fuel in the fuel tank 10. Another sensor 24 is provided at the top of the tank 10 for detecting the pressure in the tank 10. Moreover, a flow control valve 26 made up of a solenoid valve is provided at the passage 14 for opening or closing the same. The sensors 22,24 and the valve 26 are connected with an on-board control unit 30 having a microcomputer. Based on outputs of the sensors 22,24, the control unit 30 controls the valve 26 by changing a pulse duty ratio for driving the valve through a circuit, not shown, in a manner known as the pulse width modulation for controlling flow amount of the vaporized fuel to be fed to the canister 16 from the fuel tank 10.

Figure 2:
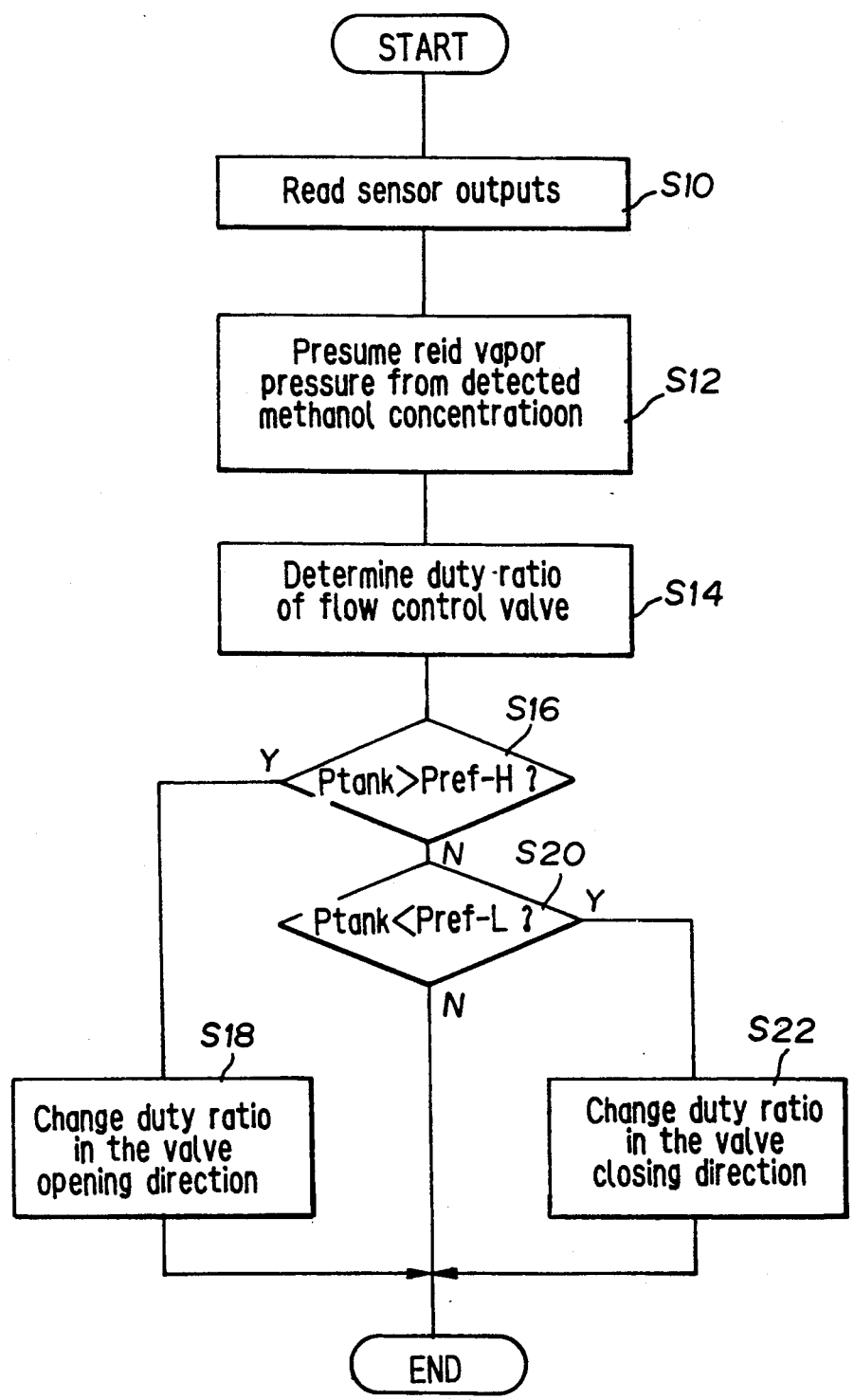
FIG. 2 is a flowchart showing the mode of operation of the control unit illustrated in FIG. 1.

Next, the mode of the operation of the control unit 30 will be explained along a flowchart shown in FIG. 2. Before beginning the explanation, however, the control of the invention will be briefly stated.

Figure 3:
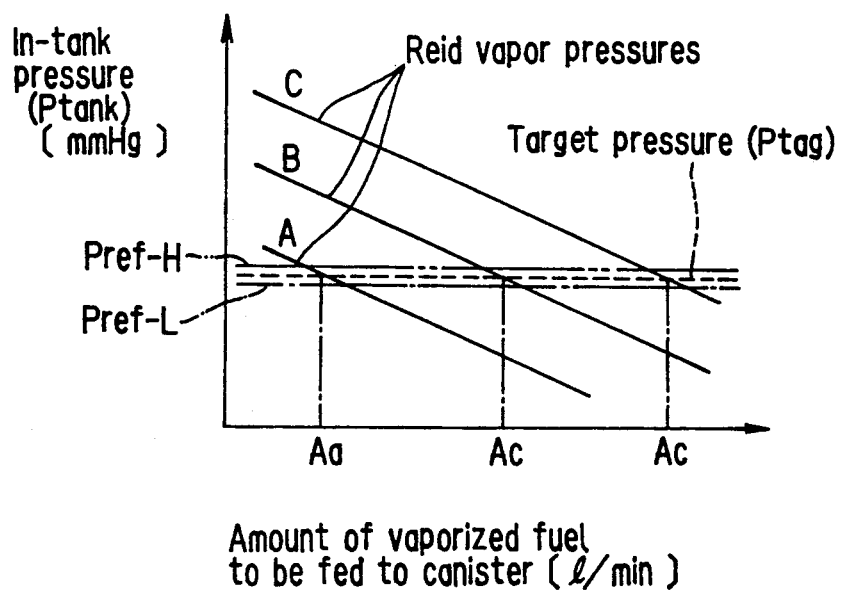
FIG. 3 is a graph showing the characteristics of the relationship between the amount of vaporized fuel to be reduced from a fuel tank and the in-tank pressure at different reid vapor pressures.
Figure 4:
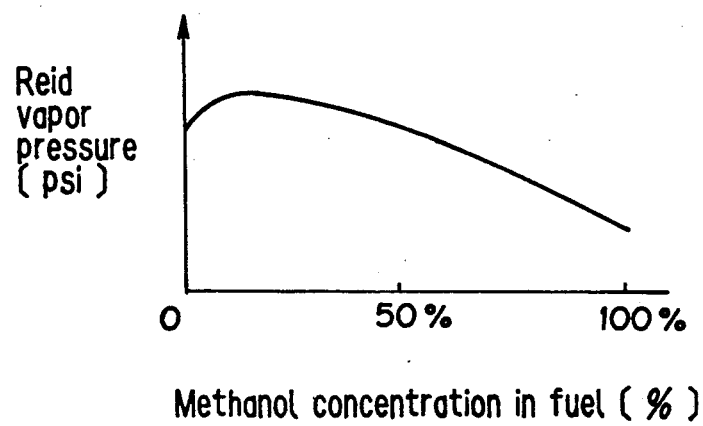
FIG. 4 is a graph showing the characteristics of the relationship between the methanol concentration in fuel and the reid vapor pressure of blended fuel.

As was earlier mentioned, referring to the graph of FIG. 4 showing the relationship between the methanol concentration and the reid vapor pressure of the blended fuel being used, the reid vapor pressure varies markedly with the methanol concentration in the fuel. The reid vapor pressure is not exactly the same as the in-tank pressure, since the in-tank pressure is likely to vary with the ambient temperature caused by the engine or the like. Nevertheless, there is a proportional relationship between the reid vapor pressure and the in-tank pressure. In order to regulate the in-tank pressure constant, it is then necessary to take the reid vapor pressure into consideration. According to the present invention, therefore, the in-tank pressure is regulated to a predetermined target value in response to the reid vapor pressure. More specifically, a graph of FIG. 3 illustrates the control according to the present invention. As shown, the abscissa of the graph indicates the amount of vaporized fuel to be fed to the canister and the ordinate the pressure in the fuel tank. And characteristics marked by A, B, C in the graph mean three examples of different reid vapor pressures, in which A<B<C, and a pressure Ptag designates a target pressure. In the control of the invention, it is arranged such that, in order to keep the in-tank pressure (named as Ptank) at the target pressure Ptag, the amount of vaporized fuel to be fed to the canister is increased as the reid vapor pressure rises. For example, the amount of vaporized fuel to be fed to the canister is relatively small as marked as "Aa" when the reid vapor pressure is relatively low as marked as "A", whereas the amount is increased as "Ac" when the pressure rises to "C" such that the in-tank pressure is held constant irrespective of the change in the reid vapor pressure.

Now, referring to FIG. 2, the operation will be explained. The program starts at step S10 in which outputs of the alcohol concentration sensor 22 and the pressure sensor 24 are read out and the current reid vapor pressure is then presumed at the next step S12 by retrieving a look-up table stored in the microcomputer in the control unit 30 and having the characteristics shown in FIG. 4. Then, at step S14, an amount of vaporized fuel to be fed to the canister is determined by retrieving another look-up table having the characteristics shown in FIG. 3, from the presumed reid vapor pressure such as by selecting the line C for example, and a pulse duty ratio of the solenoid flow control valve 26 is accordingly determined to feed the determined vaporized fuel amount to the canister.

The program then advances to step S16 in which it is judged if the detected in-tank pressure Ptank is greater than a reference pressure Pref-H set high beyond the target pressure Ptag by 2%, for example. If the judgment is affirmative, the program proceeds to step S18 in which the pulse duty ratio is changed to drive the valve in the opening direction to increase the amount to be supplied to the canister. If the result at step S16 is negative, on the other hand, the program then proceeds to step S20 in which the pressure is again compared with another reference pressure Pref-L set lower than the target pressure by, for example 2%. If the judgment is affirmative, the program advances to step S22 in which the pulse duty ratio is changed to drive the valve in the opposite direction. If the judgment is negative at step S20, this means that pressure is within the range of plus-minus 2% of the target pressure, and so the program is immediately terminated.

With the above-described arrangement, the in-tank pressure is regulated in the proximity of the target pressure. As a result, It becomes possible to reduce the size and weight of the fuel tank and hence to improve fuel consumption efficiency.

The means for detecting the alcohol content of the blended fuel and the fuel tank pressure and the arrangement of the flow control valve are not limited as to type and can be easily selected as required by an expert in the field. Different from the embodiment described in the foregoing, it is alternatively possible to provide the flow control valve in the passage 20 between the canister 16 and the engine air intake system.

The present invention has thus been shown and described with reference to the specific embodiments. However, it should be noted that the present invention is in no way limited to the details of the described arrangements but changes and modifications may be made without departing from the scope of the appended claims.

What is claimed is:

1. A system for controlling an amount of vapor fuel evaporating from a blended fuel composed of gasoline and an alcohol contained in a fuel tank mounted at a vehicular internal combustion engine, to be fed to a canister connected to the tank, comprising:
    first means for detecting a pressure in the tank; and
    control means for adjusting the amount of vapor fuel fed to the canister in response to the detected alcohol concentration and the pressure in the tank such that the in-tank pressure is kept at a predetermined pressure.

2. A system for controlling an amount of vapor fuel evaporating from a blended fuel composed of gasoline and an alcohol contained in a fuel tank mounted at a vehicular internal combustion engine, to be fed to a canister connected to the tank, comprising:
    first means for detecting alcohol concentration in the blended fuel;
    second means for presuming reid vapor pressure of the fuel in the tank in response to the detected alcohol concentration;
    third means for detecting the pressure in the tank; and
    control means for adjusting the amount of the vapor fuel to be fed to the canister in responsive to the presumed reid vapor pressure in such a manner that the in-tank pressure is kept at a predetermined pressure.

3. A system according to claim 2, further including a solenoid valve provided at an outlet of the tank for opening or closing the outlet, and said control means adjusts the vapor fuel amount to be fed to the canister by changing a pulse duty ratio for driving the solenoid valve such that the amount increases as the reid vapor pressure rises.

* * * * *